United States Patent
Taguchi et al.

(10) Patent No.: US 7,598,190 B2
(45) Date of Patent: Oct. 6, 2009

(54) ULTRAVIOLET AND INFRARED ABSORPTIVE GREENISH GLASS

(75) Inventors: Yasushi Taguchi, Mie (JP); Koji Misaka, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 494 days.

(21) Appl. No.: 10/577,419

(22) PCT Filed: Oct. 29, 2004

(86) PCT No.: PCT/JP2004/016121

§ 371 (c)(1),
(2), (4) Date: Apr. 27, 2006

(87) PCT Pub. No.: WO2005/042425

PCT Pub. Date: May 12, 2005

(65) Prior Publication Data

US 2007/0072760 A1    Mar. 29, 2007

(30) Foreign Application Priority Data

Oct. 31, 2003 (JP) .............................. 2003-373478
Dec. 3, 2003 (JP) .............................. 2003-403996

(51) Int. Cl.
*C03C 3/095* (2006.01)
*C03C 3/087* (2006.01)
(52) U.S. Cl. .............................. 501/64; 501/70; 501/71
(58) Field of Classification Search ................ 501/64, 501/70, 71
See application file for complete search history.

(56) References Cited

U.S. PATENT DOCUMENTS

| 4,792,536 | A |   | 12/1988 | Pecoraro et al. | |
|---|---|---|---|---|---|
| 6,468,934 | B2 | * | 10/2002 | Nagashima et al. | 501/64 |
| 6,624,102 | B2 | * | 9/2003 | Seto et al. | 501/71 |
| 6,753,280 | B2 | * | 6/2004 | Seto et al. | 501/70 |
| 7,151,065 | B2 | * | 12/2006 | Thomsen et al. | 501/71 |
| 2001/0018393 | A1 | * | 8/2001 | Nagashima et al. | 501/64 |
| 2003/0083188 | A1 | * | 5/2003 | Seto et al. | 501/71 |
| 2005/0020430 | A1 | * | 1/2005 | Thomsen et al. | 501/64 |

FOREIGN PATENT DOCUMENTS

| EP | 0 790 219 A1 | 8/1997 |
|---|---|---|
| EP | 0 834 481 A1 | 4/1998 |
| EP | 0 854 118 A1 | 7/1998 |
| JP | 4-46031 A | 2/1992 |
| JP | 4-310539 A | 11/1992 |
| JP | 5-27578 B2 | 4/1993 |
| JP | 6-88812 B2 | 11/1994 |
| JP | 6-321577 A | 11/1994 |
| JP | 8-217485 A | 8/1996 |
| JP | 9-208251 A | 8/1997 |
| JP | 9-208254 A | 8/1997 |
| JP | 10-152342 A | 6/1998 |
| JP | 10-297934 A | 11/1998 |
| WO | WO 91/07356 A1 | 5/1991 |

OTHER PUBLICATIONS

International Search Report dated Dec. 28, 2004 (One (1) Page).
Supplementary European Search Report dated Dec. 9, 2008 (Three (3) pages).

* cited by examiner

*Primary Examiner*—Karl E Group
*Assistant Examiner*—Elizabeth A Bolden
(74) *Attorney, Agent, or Firm*—Crowell & Moring LLP

(57) ABSTRACT

The present invention relates to an ultraviolet and infrared absorptive greenish glass (the first glass) containing in weight % expression at least coloring components of 0.3-0.5% of total $Fe_2O_3$, 0.8-2.0% $CeO_2$, 0.8-2.0% $TiO_2$, and 0.10-0.25% of FeO. This first glass may be an ultraviolet and infrared absorptive greenish glass (the second glass) in which $CeO_2$ amounts to 0.8-1.5% and $TiO_2$ amounts to 0.8-1.5%, and which contains at least 0.1-0.7% SnO as a coloring component. Each glass is characterized in each glass at 5 mm thickness is 9% or less in ultraviolet transmittance ($T_{uv}$) according to ISO/DIS9050, 1% or less in 350 nm wavelength transmittance ($T_{350}$), 70% or greater in 550 nm wavelength transmittance ($T_{550}$), and 25% or less in 1100 nm wavelength transmittance ($T_{1100}$).

14 Claims, 2 Drawing Sheets

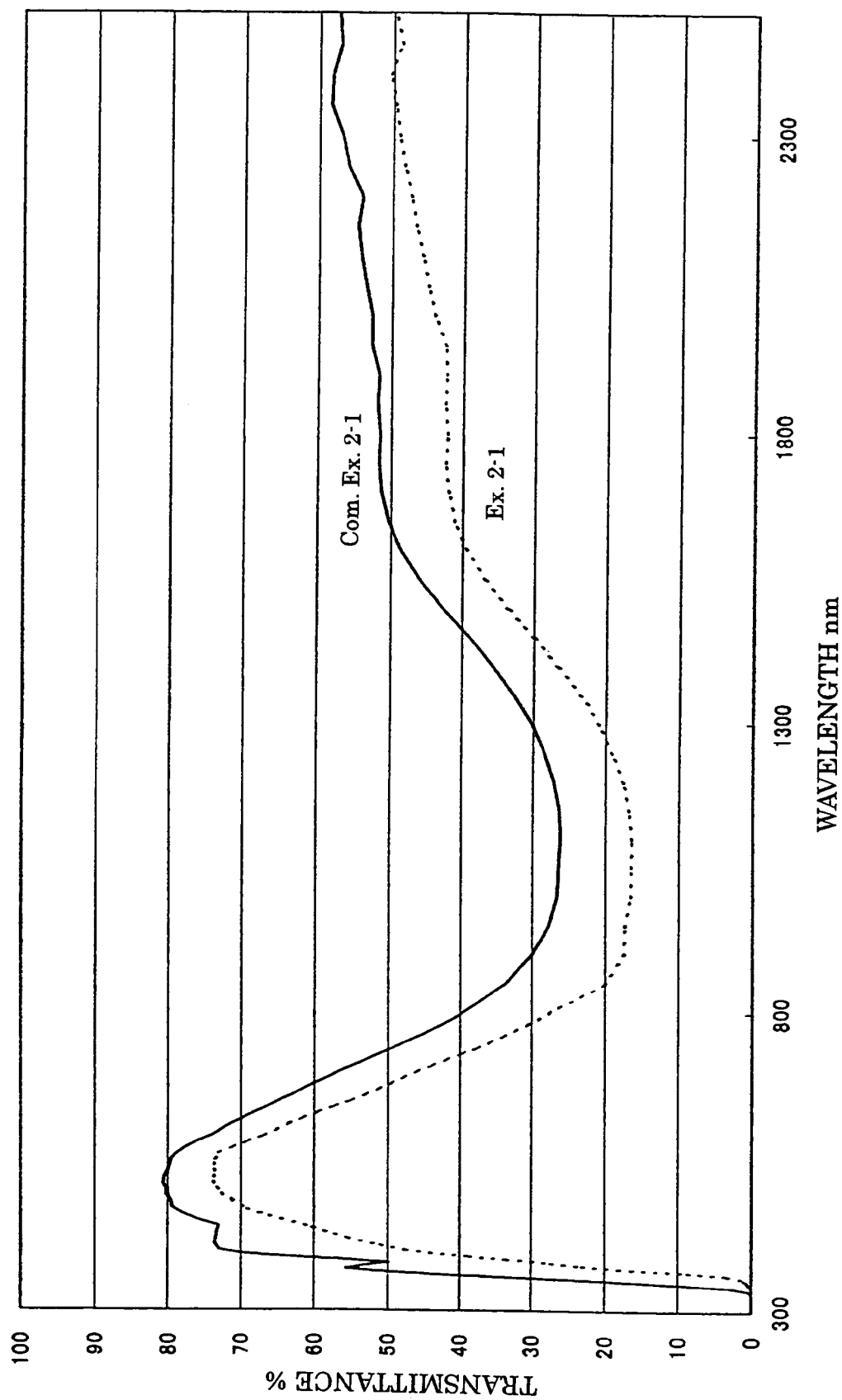

ULTRAVIOLET AND INFRARED ABSORPTIVE GREENISH GLASS

TECHNICAL FIELD

The present invention relates to an ultraviolet and infrared absorptive greenish glass that makes high inhabitability possible by having a relatively high transparency and infrared and ultraviolet shielding.

BACKGROUND OF THE INVENTION

Hitherto, from the viewpoint of energy conservation represented by the reduction of cooling load, there has been a social stream toward reducing the effect of infrared rays as much as possible. Such stream tends to be increased more and more due to the increase of interest about global warming phenomena and environmental problems and the like. This stream brings about various changes to glass industry. By providing glass itself or the glass surface with the absorption function and the reflection function, glasses that reduce the effect of infrared rays have been developed, and they have been commercialized as infrared absorptive glasses or infrared reflective glasses.

There is known a soda-lime-silica glass (see Patent Publication 1) that has a composition comprising by weight % 66-75% $SiO_2$, 12-20% $Na_2O$, 7-12% CaO, 0-5% MgO, 0-4% $Al_2O_3$, 0-3% $K_2O$, 0-1% $Fe_2O_3$, and 0-1.5% of the total of $CeO_2$, $TiO_2$, $V_2O_5$ or $MoO_3$, that is a glass article in which the total iron is in at least 0.45 weight %, and its 35% or greater is of an iron that is in the ferrous iron condition represented by FeO, and less than 0.02 weight % of sulfur expressed as $SO_3$ is contained, and that is of an infrared absorptive type showing a visible light transmittance (400-770 nm) of at least 65% and an infrared transmittance (800-2100 nm) of not greater than 15%.

There is a social movement towards reducing the effect of ultraviolet rays as much as possible, such as ultraviolet deterioration of organic materials represented by fading phenomena and the occurrence of skin cancer by ultraviolet irradiation. In view of such movement, there is a study of a commercial product that reduces the effect of ultraviolet rays by providing the glass itself or the glass surface with the ultraviolet absorptive function and reflective function. Its representative example is ultraviolet absorptive glass.

There is known an ultraviolet absorptive colored glass (see Patent Publication 2) which has a composition substantially comprising by weight % 65-75% $SiO_2$, 0.1-5 $Al_2O_3$, 10-18% $Na_2O$, 0-5% $K_2O$, 5-15% CaO, 1-6% MgO, 0.05-1.0% $SO_3$, 0.2-1.5% Ce moiety in terms of $CeO_2$, 0-1.0% Ti moiety in terms of $TiO_2$, 0.001-0.006% CoO, 0.3-1.6% Fe moiety in terms of $Fe_2O_3$, and in which 5-18 wt % of the Fe moiety in terms of $Fe_2O_3$ is of $Fe^{2+}$.

There are described in this patent publication that the dominant wavelength measured with C light source is 488-492 nm and the color purity is 3-4%, that the visible light transmittance measured at a thickness of 3-5 mm with A light source is 70% or greater, that the ultraviolet transmittance defined in ISO is 15% or less, that, if the content of CoO is less than 0.001%, the dominant wavelength becomes too long, thereby having a yellow color tone, and that, if it is greater than 0.006%, the dominant wavelength becomes too short, thereby not obtaining a bluish glass.

Furthermore, it has changed to a stream to simultaneously reduce the effect by ultraviolet rays and the effect by infrared rays. This stream is in a direction to increase more and more due to the increased interest in global warming phenomena and environmental problems and the like. In this stream, a so-called ultraviolet and infrared absorptive glass that absorbs both of ultraviolet rays and infrared rays attracts attention, in addition to conventional infrared absorptive glass and ultraviolet absorptive glass.

There is disclosed an infrared and ultraviolet absorptive, soda-lime-silica, greenish glass (see Patent Publication 3), which contains as major components 0.65-1.25 wt % Fe in terms of $Fe_2O_3$, 0.2-1.4 wt % $CeO_2$ or 0.1-1.36 wt % $CeO_2$ and 0.02-0.85 wt % $TiO_2$, and in which the weight ratio of FeO to $Fe_2O_3$ is fixed to have at a thickness of 3-5 mm an Illuminant A visible light (wavelength 400-770 nm) of 70% or greater, a total solar energy (wavelength: 300-2130 nm) transmittance of 46% or less and an ultraviolet (wavelength 300-400 nm) transmittance of 38% or less.

There are described in this patent publication that the above Fe is 0.48-0.92 wt % $Fe_2O_3$ and 0.15-0.33 wt % FeO, that the weight % of FeO constitutes a reduction percent of 23-29% of the total iron content expressed as $Fe_2O_3$, that Illuminant C dominant wavelength is 498-525 nm, that the color purity is 2-4%, and that 65-75 wt % $SiO_2$, 10-15 wt % $Na_2O$, 0-4 wt % $K_2O$, 1-5 wt % MgO, 5-15 wt % CaO and 0-3 wt % $Al_2O_3$ are contained.

There is disclosed an infrared and ultraviolet absorptive glass (see Patent Publication 4), which substantially comprises in terms of oxide 65-75 wt % $SiO_2$, 0.1-5 wt % $Al_2O_3$, 10-18 wt % $Na_2O$, 0-5 wt % $K_2O$, 5-15 wt % CaO, 1-6 wt % MgO, 0.1-3 wt % $CeO_2$, 0.5-1.2 wt % $Fe_2O_3$, 0.05-1.0 wt % $SO_3$, and 0-1.0 wt % $TiO_2$, and in which 20-40% by weight of the total iron content expressed as $Fe_2O_3$ are in ferrous iron (FeO).

There are described in this patent publication that a coloring agent may be added to the glass of the above-mentioned compositional range to the extent that the total amount of one kind or two kinds or more of NiO, CoO, MnO, $V_2O_5$, $MoO_3$ and the like is in 0-1.5 wt %, that according to need 0-3 wt % of ZnO may be added in order to prevent deterioration of color tone by ultraviolet rays and coloring of amber, and that the visible transmittance (380-780 nm) is 66.1-66.8%, the solar heat transmittance (340-1800 nm) is 37.7-38.4%, and the dominant wavelength is 501-503 nm (green color) at 5 mm in thickness in examples.

There is disclosed an ultraviolet and infrared absorptive glass (see Patent Publication 5) which has a composition of 65-75% $SiO_2$, 0-5% $Al_2O_3$, 10-18% $Na_2O$, 0-5% $K_2O$, 5-15% CaO, 0-5% MgO, 0.1-3% $CeO_2$, 0.2-1% FeO, and 0.1-3% $SnO_2$ in weight %, which contains 0-1.5% of a coloring agent such as NiO, CoO, MnO, $V_2O_5$, $MoO_3$ and the like, 0-3% ZnO, and 0.1-3% $SnO_2$, and in which the dominant wavelength is 488-497 nm.

The present applicant also discloses an ultraviolet and infrared absorptive greenish glass (see Patent Publication 6) which contains by weight % 67-75% $SiO_2$, 0.05-5% $Al_2O_3$, 12-16% $Na_2O$, 0.5-3% $K_2O$, 7-11% CaO, 2-4.2% MgO, 0.05-0.3% $SO_3$, 1.0-2.5% $CeO_2$, 0.1-1.0% $TiO_2$, 0.0010-0.0400% MnO, 0.0001-0.0009% CoO, and 0-1% $SnO_2$, and which has a composition of 70-76% of $SiO_2+Al_2O_3+TiO_2$, 10-15% of CaO+MgO, and 13-17% of $Na_2O+K_2O$.

Furthermore, even in the same ultraviolet and infrared absorptive glasses, their color tones are important. For example, green glass and blue glass are considered to be completely different commercial products. For example, it is actual that buildings that have been built are formed of similar color tones and that the color tones are also strictly managed, except an extremely special example in which a pattern is formed of color difference. There has also been a case in which raw materials that have not been problematic so far are also limited due to the increased interest to the global environmental problems as compared with the past. Furthermore, the property requirement for various materials has become strict. Thus, there has been a case of an extremely complicated condition in which raw materials and properties, which are usable for certain commercial products, cannot be used for other commercial products.

As mentioned above, the environment surrounding glass has greatly changed, and it is in a condition in which glasses satisfying the complicated requirement specifications have not been developed sufficiently. In particular, it is a social demand for the development of an ultraviolet and infrared absorptive greenish glass of a predetermined green color tone and of not using selenium as a raw material.

Patent Publication 1: Japanese Patent Examined Publication 5-27578

Patent Publication 2: Japanese Patent Unexamined Publication 6-321577

Patent Publication 3: Japanese Patent Examined Publication 6-88812

Patent Publication 4: Japanese Patent Unexamined Publication 4-310539

Patent Publication 2: Japanese Patent Unexamined Publication 4-46031

Patent Publication 2: Japanese Patent Unexamined Publication 9-208254

SUMMARY OF THE INVENTION

It is an object of the present invention to provide a glass that achieves high performance infrared absorption and ultraviolet absorption together with a greenish color tone with a good balance, that has a sufficient transparency, and that has a predetermined greenish color tone.

According to the present invention, there is provided, in a soda-lime-silica series glass, an ultraviolet and infrared absorptive greenish glass, which is characterized in that, in an expression of weight %, it comprises at least coloring components of 0.3-0.5% of total $Fe_2O_3$, 0.8-2.0% $CeO_2$, 0.8-2.0% $TiO_2$, and 0.10-0.25% FeO, and that the glass at 5 mm thickness is 9% or less in ultraviolet transmittance ($T_{uv}$) according to ISO/DIS9050, 1% or less in 350 nm wavelength transmittance ($T_{350}$), 70% or greater in 550 nm wavelength transmittance ($T_{550}$), and 25% or less in 1100 nm wavelength transmittance ($T_{1100}$).

BRIEF DESCRIPTION OF THE DRAWINGS

FIG. 2 shows transmittance curves of Example 2-1 and Comparative Example 2-1.

DETAILED DESCRIPTION

Figure 1:
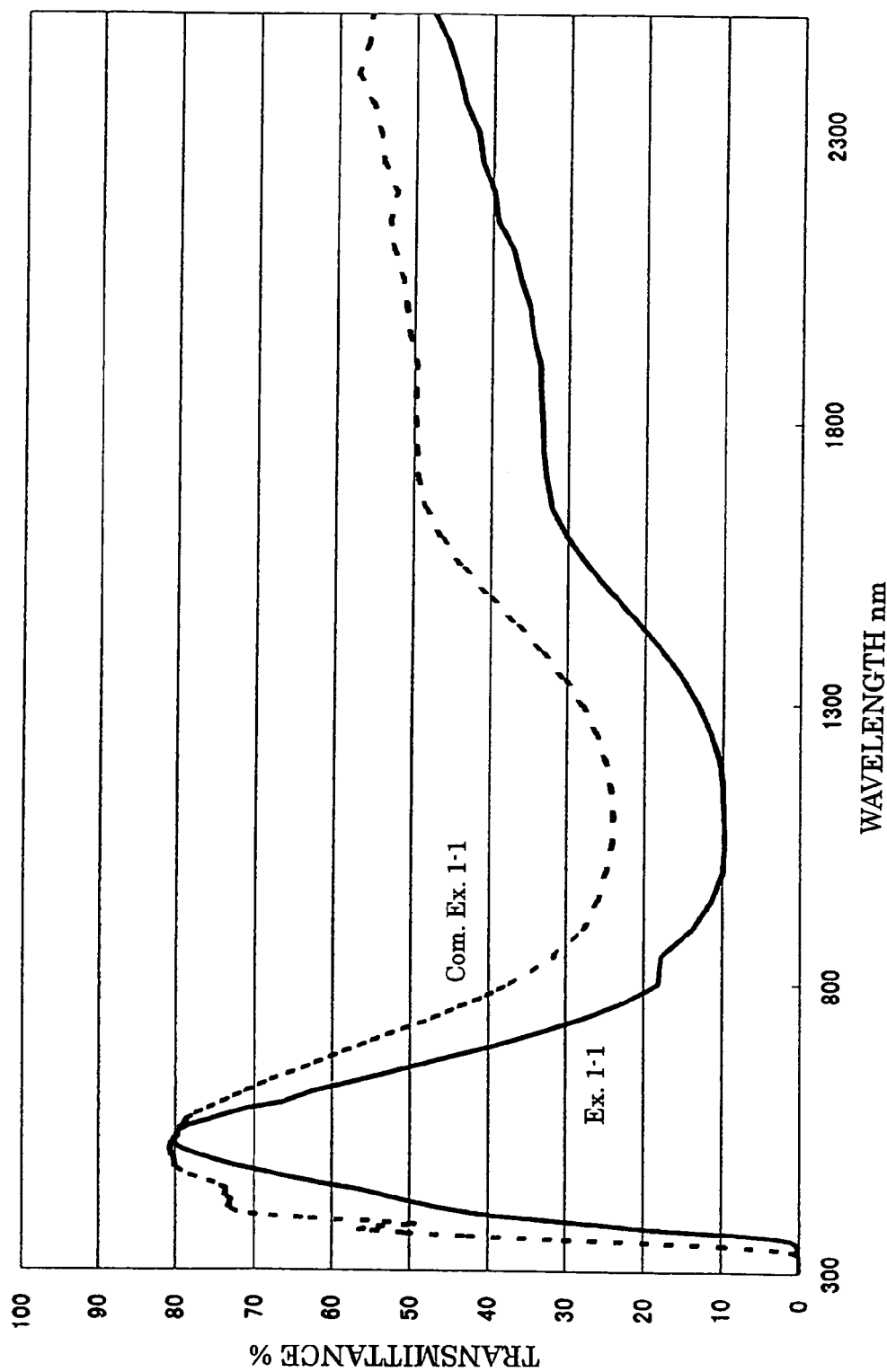
FIG. 1 shows transmittance curves of Example 1-1 and Comparative Example 1-1.

According to the present invention, it is possible to obtain a glass that achieves high performance infrared absorption and ultraviolet absorption together with a greenish color tone with a good balance, that has a sufficient transparency, and that has a predetermined greenish color tone. It is possible to improve productivity with increased quality and yield and to produce with stable operation without greatly changing the operation conditions and the plate forming conditions of the actual furnace in float process.

The present invention can be used for an electronic material field that requires ultraviolet and infrared absorptive properties, as well as conventional plate glass field such as architectural window glass and automotive window glass.

The above-mentioned first glass may be an ultraviolet and infrared absorptive greenish glass (the second glass), in which $CeO_2$ is in an amount of 0.8-1.5% and $TiO_2$ is in an amount of 0.8-1.5%, and which further contains at least SnO of 0.1-0.7% as a coloring component. This second glass is also characterized in that the second glass at 5 mm thickness is 9% or less in ultraviolet transmittance ($T_{uv}$) according to ISO/DIS9050, 1% or less in 350 nm wavelength transmittance ($T_{350}$), 70% or greater in 550 nm wavelength transmittance ($T_{550}$), and 25% or less in 1100 nm wavelength transmittance ($T_{1100}$). In other words, the second glass is one example of the first glass.

In the following, the ultraviolet and infrared absorptive, greenish, first and second glasses of the present invention are described in detail. In case that a description of each paragraph is not limited to either the first glass or the second glass of the present invention, the description is a description common to the first and second glasses.

$Fe_2O_3$ functions as a component that absorbs ultraviolet rays and secures a predetermined color tone, and is necessary for stably obtaining various optical properties. In relation to analysis, the sum of iron is expressed as $Fe_2O_3$. It is, however, total $Fe_2O_3$, since the form of FeO is included in this. In general, FeO absorbs infrared rays and is necessary, together with $Fe_2O_3$ that absorbs ultraviolet rays and secures a predetermined color tone, and together with each coloring factor such as $CeO_2$ and $TiO_2$. That is, if total $Fe_2O_3$ is less than 0.3%, the function to the above becomes inferior. If it exceeds 0.5%, there occurs particularly a problem of lowering of the visible light transmittance. Total $Fe_2O_3$ component is more preferably in 0.35-0.45% by weight %.

In the first glass, $CeO_2$ has mainly an ultraviolet absorptive function/effect. Its amount has been set to 0.8-2.0% by weight %, because there is a problem of an insufficient ultraviolet absorptive function in the case of less than 0.8%. On the other hand, if it exceeds 2%, the oxidation function by $CeO_2$ becomes too strong, and the color tone of glass tends to have a yellowish color. Furthermore, there occurs a problem of the increase of the raw material cost. More preferably, it is 0.9-1.9%. Further preferably, it is 1.0-1.8%.

Also in the second glass, $CeO_2$ has mainly an ultraviolet absorptive function/effect. Its amount has been set to 0.8-1.5% by weight %, because there is a problem of an insufficient ultraviolet absorptive function in the case of less than 0.8%. On the other hand, if it exceeds 1.5%, the oxidation function by $CeO_2$ becomes too strong, and the color tone of glass tends to have a yellowish color. Furthermore, there occurs a problem of the increase of the raw material cost. More preferably, it is 0.9-1.4%. Further preferably, it is 1.0-1.3%.

In the first glass, similar to $CeO_2$, $TiO_2$ also has mainly an ultraviolet absorptive function/effect. Its amount has been set to 0.8-2% by weight %, because there are in the case of less than 0.8% a problem of an insufficient ultraviolet absorptive function and a problem of the color tone of glass becomes too blue in relation with other coloring components. On the other hand, if it exceeds 2%, there occur a problem in which the color tone of glass tends to have a yellowish color and a problem in which the visible light transmittance becomes too low. More preferably, it is 0.9-1.9%. Further preferably, it is 1.0-1.8%.

In the second glass, similar to $CeO_2$, $TiO_2$ also has mainly an ultraviolet absorptive function/effect. Its amount has been set to 0.8-1.5% by weight %, because there are in the case of less than 0.8% a problem of an insufficient ultraviolet absorptive function and a problem of the color tone of glass becomes too blue in relation with other coloring components. On the other hand, if it exceeds 1.5%, there occur a problem in which the color tone of glass tends to have a yellowish color and a problem in which the visible light transmittance becomes too low. More preferably, it is 0.9-1.4%. Further preferably, it is 1.0-1.3%.

In the second glass, it is preferable that SnO is added in a range of 0.1-0.7%. SnO has an effect of the reduction action and is effective for adjusting the color tone. It is possible to reduce the contents of other coloring factors. It is possible to increase the infrared absorptive capability and at the same time adjust the glass color tone. However, if SnO is less than 0.1%, the above-mentioned effect becomes small, and it becomes extremely difficult to obtain a color tone of green color. On the other hand, if it exceeds 0.7%, the reduction action becomes too strong. Amber tends to appear, and the color tone of glass has a strong bluish color tone. Therefore, the present color tone is not preferable. More preferably, it is 0.2-0.5%.

The reason why they have been set to the above-mentioned ranges is that each component is necessary for obtaining absorption of ultraviolet rays and infrared rays and a color tone of green color. Their balances are extremely important, and it is possible to obtain a desired greenish ultraviolet and infrared absorptive glass.

The reason why an ultraviolet and infrared absorptive greenish glass having an ultraviolet transmittance ($T_{uv}$) of not greater than 9% according to ISO/DIS9050 at 5 mm thickness is preferable is that various deterioration problems occur by ultraviolet rays if it exceeds 9%. Herein, the ultraviolet transmittance ($T_{uv}$) according to ISO/DIS9050 represents a transmittance in a wavelength region of 297.5-377.5 nm. Herein, the reason why it has been set to a wavelength region of 297.5-377.5 nm is that both of a medium wavelength ultraviolet rays (UVB) of a wavelength of about 290-320 and a long wavelength ultraviolet rays (UVA) of about 320-400 nm were taken into consideration.

The reason why an ultraviolet and infrared absorptive greenish glass having a 350 nm wavelength transmittance ($T_{350}$) of not greater than 1% is preferable is that an effect referred to as a so-called ultraviolet deterioration is great and that problems occur if it exceeds 1%. Herein, the reason why it has been represented by a light of 350 nm wavelength is that there has been taken into account a long wavelength ultraviolet rays (UVA) of a wavelength of about 320-400 nm, that is, so-called A ultraviolet rays that, for example, are strong in penetration into human skin, that cause stain and sag by an action to fiber such as collagen fiber and elastic fiber in derma of skin, and that make stain and freckle inferior by an action to melanin present in skin.

The reason why an ultraviolet and infrared absorptive greenish glass having a 550 nm wavelength transmittance ($T_{550}$) of not less than 70% at 5 mm thickness is preferable is that there may occurs a problem in transparency that is one great characteristic of glass if it is less than 70%. Herein, the reason why it has been represented by a 550 nm wavelength light is that transmittance with green color is mainly considered.

The reason why an ultraviolet and infrared absorptive greenish glass having a 1100 nm wavelength transmittance ($T_{1100}$) of not greater than 25% at 5 mm thickness is preferable is that, for example, the cooling load increases and thereby it contradicts with global warming phenomena and environmental problems. Therefore, an ultraviolet and infrared absorptive greenish glass having a 1100 nm wavelength transmittance ($T_{1100}$) of not greater than 15% at 5 mm thickness may become preferable.

There is preferable the above ultraviolet and infrared absorptive greenish glass which comprises in weight % expression 67-75% $SiO_2$, 0.5-3.0% $Al_2O_3$, 7.0-11.0% CaO, 2.0-4.2% MgO, 12-16% $Na_2O$, 0.5-3.0% $K_2O$, and 0.05-0.3% $SO_3$ in addition to the above coloring components of glass, in which the sum of these components and the coloring components is 98% or greater, and in which $SiO_2+Al_2O_3+TiO_2$ is 70-76%, CaO+MgO is 10-15%, and $Na_2O+K_2O$ is 13-17%.

The reason why $SiO_2$ component has been set to 67-75% by weight % is that the surface tends to have stain or the like, weather resistance lowers, and a practical problem occurs if it is less than 67%. If it exceeds 75%, melting also becomes difficult.

The reason why $Al_2O_3$ component has been set to 0.5-3.0% by weight % is that weather resistance lowers, the surface tends to have stain or the like, and a practical problem occurs if it is less than 0.5%. On the other hand, if it exceeds 3%, devitrification tends to occur. Therefore, the forming temperature range becomes narrow, resulting in difficulty in production.

The reason why CaO component has been set to 7.0-11.0% by weight % is that the melting temperature becomes high since flux tends to be insufficient, and the production becomes difficult since the flow temperature does not become low, if it is less than 7.0%. On the other hand, if it exceeds 11%, devitrification tends to occur, and the production becomes difficult since the forming operation range becomes narrow.

The reason why MgO component has been set to 2.0-4.2% by weight % is that the melting temperature increases to narrow the operation range, thereby making the production difficult, if it is less than 2.0%, and that meltability becomes inferior if it exceeds 4.2%.

The reason why $Na_2O$ component has been set to 12.0-16.0% by weight % is that meltability becomes inferior and tempering easiness lowers, forming becomes difficult, and the production becomes difficult since devitrification tends to occur and the operation range narrows, if it is less than 12.0. On the other hand, if it exceeds 16%, weather resistance lowers, and the surface tends to have stain or the like, resulting in the occurrence of a practical problem.

The reason why $K_2O$ component has been set to 0.5-3.0% is that tempering easiness lowers if it is less than 0.5%, and weather resistance lowers and the cost increases if it is greater than 3.0%.

The reason why $SO_3$ component has been set to 0.05-0.3% is that, for example, deforming or homogeneity tends to become insufficient in normal melting if it is less than 0.05%. If it exceeds 0.3%, the coloring condition of glass is particularly affected. For example, it tends to have a color tone of yellow or amber-like color, and it becomes impossible to obtain a desired greenish color tone. It is preferably 0.1-0.2%.

The reason why the total of the components of $SiO_2$, $Al_2O_3$, CaO, MgO, $Na_2O$, $K_2O$, $SO_3$, $Fe_2O_3$, $CeO_2$ and $TiO_2$ has been set to 98% or greater by weight percent in the first glass is that the total of minor components, such as CoO, $Cr_2O_3$ and SnO, which may be added in some cases, is made not to exceed 2%.

The reason why the total of the components of $SiO_2$, $Al_2O_3$, CaO, MgO, $Na_2O$, $K_2O$, $SO_3$, $Fe_2O_3$, $CeO_2$ and $TiO_2$ has been set to 98% or greater by weight percent in the second glass is that the total of minor components, such as CoO, $Cr_2O_3$, $V_2O_5$ and MoO, which may be added in some cases, is made not to exceed 2%.

Furthermore, the reason why $SiO_2+Al_2O_3+TiO_2$ has been set to 70-76% by weight percent is that weather resistance lowers if it is less than 70% and that a problem of the decrease of tempering easiness occurs if it is greater than 76%. It is preferably about 70-74%.

The reason why CaO+MgO has been set to 10-15% by weight percent to use CaO and MgO components for lowering the melting temperature. Furthermore, tempering easiness lowers if it is less than 10%. If it exceeds 15%, devitrification tends to occur, thereby making the production difficult. It is preferably about 11.5-15%.

The reason why $Na_2O+K_2O$ has been set to 13-17% by percent is that tempering easiness lowers, devitrification also tends to occur, and the operation temperature range upon forming narrows, thereby making the production difficult, if it is less than 13%. On the other hand, if it exceeds 17%, weather resistance lowers, a practical problem occurs, and the cost increases.

Furthermore, there is preferable an ultraviolet and infrared absorptive greenish glass in which $FeO/Fe_2O_3$ is 0.3-0.6 in weight ratio expression and $CeO_2/TiO_2$ is 0.7-1.3 in weight ratio expression. FeO and $Fe_2O_3$ are generally different in their functions. Mainly, $Fe_2O_3$ has a considerable influence on the ultraviolet region, and FeO has a considerable influence on the infrared region. Therefore, although they are the same iron components, it is preferable to control their proportions. If $FeO/Fe_2O_3$ in weight ratio expression is less than 30%, there occurs a problem in which infrared absorption is low, resulting in too high solar radiation transmittance. On the other hand, $FeO/Fe_2O_3$ in weight ratio expression exceeds 0.6, the solar radiation transmittance becomes low; however, there occurs a problem in which the color tone of glass becomes too blue. More preferably, it is in a range of 0.4-0.6.

$CeO_2$ and $TiO_2$ have an absorptive function/effect of mainly ultraviolet rays. However, they are different from each other in terms of influence on the absorptive function of ultraviolet rays and make a difference in color tone. Therefore, it is preferable to set the range of $CeO_2/TiO_2$ in weight ratio expression. If $CeO_2/TiO_2$ in weight ratio expression is less than 0.7, there occurs a problem of insufficient ultraviolet absorptive action. On the other hand, if $CeO_2/TiO_2$ in weight ratio expression exceeds 1.3, there occurs a problem in which the color tone of glass tends to become bluish or yellowish in relation with other coloring raw materials. More preferably, it is in a range of 0.8-1.2. Further preferably, it is in a range of 0.85-1.15.

An ultraviolet and infrared absorptive greenish glass having a solar radiation transmittance $(T_s)$ of 48% or less is preferable. If it exceeds 48%, for example, the cooling load increases, thereby contradicting with global warming phenomena and environmental problems. That is, if it exceeds 48%, the cooling load increases, or the actual feeling of the effect of improving inhabitability of car or room interior diminishes. In particular, it becomes difficult to eliminate uncomfortableness in midsummer or the like. Therefore, it becomes impossible to sufficiently obtain the energy saving effect.

Furthermore, an ultraviolet and infrared absorptive greenish glass having a dominant wavelength (D) by $D_{65}$ light source of 510-560 nm and an excitation purity (Pe) of 10% or less is preferable. This dominant wavelength (D) and the excitation purity (Pe) are useful for setting coloring of the ultraviolet and infrared absorptive greenish glass. As the color tone, the dominant wavelength (D) by $D_{65}$ light source is preferably in 510-560 nm. If the dominant wavelength (D) by $D_{65}$ light source is in a region shorter than 510 nm, the color tone of green color becomes unsharp, and it becomes a so-called bluish color, resulting in no match with market needs preferring "deep green color". On the other hand, if the dominant wavelength (D) by $D_{65}$ light source exceeds 560 nm, a yellow color or amber color increases. This also does not match with market needs preferring "deep green color". More preferably, it is a range of 520-540 nm. On the other hand, if excitation purity (Pe) exceeds 10%, it becomes too strong; resulting in no match with recent market needs preferring an "elegant" coloring.

Furthermore, it is preferable that 5-50 ppm of $Cr_2O_3$ is contained as a coloring component in weight % expression. If it is less than 5 ppm, there occurs a problem in which the color tone of glass becomes a yellowish color tone. On the other hand, if it exceeds 30 ppm, there occurs a problem in which the visible light transmittance become too low. More preferably, it is a range of 10-25 ppm.

Although MnO is not essential, the addition of 200 ppm or less is preferable. This is because MnO has an effect of reduction action. However, if it exceeds 200 ppm, there occurs a problem in which the reduction action becomes too strong and amber tends to occur. Therefore, it is not preferable.

In the first glass, although SnO is not essential, it may be added in 1.0% or less. This is because SnO has an effect of reduction action. However, if it exceeds 1.0%, there occur problems in which the reduction action becomes too strong and amber tends to occur and in which the color tone of glass becomes a strongly bluish color tone. Therefore, it is not preferable.

To produce an ultraviolet and infrared absorptive greenish glass of the present invention, it is optional to use a frit glass, cutlet or the like containing coloring components such as $Fe_2O_3$, $CeO_2$, $TiO_2$, FeO, $Cr_2O_3$, MnO, and SnO. The quantitative adjustment of these components tends to become stable. Inclusion of FeO into glass becomes easy. The operation can be conducted in a manner to stabilize the oxidation-reduction condition of glass without greatly changing operation conditions and the like of the actual furnace. Upon adding the above-mentioned coloring components, it is possible to use carbon or a metal powder or oxide or the like of Zn. It is effective for the case of securing color tone or the like, for example, while helping fining function/effect by mirabilite ($Na_2SO_4$) or the like. Furthermore, in some cases, in the atmosphere of the adjustment region of glass furnace, the stabilization may be achieved by introducing nitrogen gas or its mixed gas or combustion exhaust gas.

An ultraviolet and infrared absorptive greenish glass of the present invention contains an easy-tempering glass composition, too. It is effective particularly for thin plate glasses having a plate thickness of about 1.5-3.5 mm, which are strength-increased products, semi-tempered products and tempered products as flat plates or curved plates. They can be used particularly as window glasses such as automobiles and train vehicles. It is possible to use them as architectural window members from thin plate glasses having a plate thickness of about 1 mm to thick plate glasses having a plate thickness of about 25 mm, as single plate glass, laminated glass, lamination glass or double glazing.

The following examples are illustrative of the present invention. In particular, the following Examples 1-1 to 1-5 correspond to the first glass of the present invention, and Examples 2-1 to 2-5 correspond to the second glass of the present invention. As stated above, however, the second glass is one example of the first glass. Therefore, it is needless to say that Examples 2-1 to 2-5 correspond to the first glass, too.

Example 1-1

As glass raw materials, there were used silica sand, feldspar, soda ash, dolomite, limestone, mirabilite, rouge, titanium oxide, and cerium carbonate. Furthermore, there were also used chemical reagents of $Al_2O_3$, $Fe_2O_3$, $CaCO_3$, $MgCO_3$, $Na_2CO_3$, $K_2CO_3$, $CeO_2$ and $TiO_2$, in addition to ilmenite, carbon and slug. Using these, a predetermined glass composition was previously set as a target composition, and they were weighed and mixed together. As a raw material batch, mirabilite/(silicon sand+feldspar) was adjusted to about 1%, and cutlet was adjusted to about 50%.

The mixed raw material was put into a crucible. It was melted for about 3-4 hours for vitrification in an actual furnace (for example, a wall portion on a lateral side of an inlet, a side wall portion of a condition portion), which was maintained at about 1450° C., or in an electric furnace made to be similar to the actual furnace while using nitrogen gas or a mixed gas containing the gas or the like. Furthermore, it was maintained at 1420-1430° C. for about 2 hr for homogenization and fining. Then, it was poured into mold. It was cut into a glass plate having a size of 100 mm×100 mm and a thickness of about 3.5 mm as a glass block, or the glass was allowed to flow out to form a plate having a size of 100 mm×100 mm and a thickness of about 3.5 mm. Then, it was ground and polished, thereby obtaining each sample.

The glass component composition (weight %) of this sample was measured by a wet analysis according to JIS R-3101 or the like, and its optical characteristics were measured by a 340-type automated spectrophotometer made by Hitachi Ltd. and JIS Z-8722, JIS R-3106 and ISO/DIS 9050.

The glass composition was in weight expression 70.1% $SiO_2$, 1.8% $Al_2O_3$, 8.2% CaO, 3.6% MgO, 12.6% $Na_2O$, 0.9% $K_2O$, 0.1% $SO_3$, 0.42% total $Fe_2O_3$, 1.1% $CeO_2$, 1.1% $TiO_2$, and 17 ppm $Cr_2O_3$. FeO was in 0.21%. $FeO/Fe_2O_3$ was 0.5 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.9%. $SiO_2+Al_2O_3+TiO_2$ was in 72.8%. CaO+MgO was in 11.8%. $Na_2O+K_2O$ was in 13.5%.

The ultraviolet transmittance ($T_{uv}$) by ISO/DIS9050 at 5 mm thickness was in 4.6%. 350 nm wavelength transmittance ($T_{350}$) was in 0%. 550 nm wavelength transmittance ($T_{550}$) was in 78%. 1100 nm wavelength transmittance ($T_{1100}$) was in 10%. The visible light transmittance ($T_v$) by A light source was in 68%. The solar radiation transmittance ($T_s$) was in 36%. The dominant wavelength (D) by $D_{65}$ light source was in 535 nm. Excitation purity (Pe) was in 5%. The measurement results, converted to 5 mm thickness, of transmittance relative to wavelength are shown in FIG. 1. It is understood that transmittance of ultraviolet and infrared region is low and that it has a characteristic of ultraviolet absorption and infrared absorption.

Example 1-2

Using glass raw materials almost similar to Example 1-1, an examination was continued by changing the glass composition. As a result, the glass composition was in weight expression 70.2% $SiO_2$, 1.8% $Al_2O_3$, 8.2% CaO, 3.6% MgO, 12.7% $Na_2O$, 0.9% $K_2O$, 0.1% $SO_3$, 0.32% total $Fe_2O_3$, 1.0% $CeO_2$, 1.0% $TiO_2$, and 13 ppm $Cr_2O_3$. FeO was in 0.15%. $FeO/Fe_2O_3$ was 0.47 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.8%. $SiO_2+Al_2O_3+TiO_2$ was in 73.0%. CaO+MgO was in 11.8%. $Na_2O+K_2O$ was in 13.8%.

The ultraviolet transmittance ($T_{uv}$) by ISO/DIS9050 at 5 mm thickness was in 8.5%. 350 nm wavelength transmittance ($T_{350}$) was in 1%. 550 nm wavelength transmittance ($T_{550}$) was in 79%. 1100 nm wavelength transmittance ($T_{1100}$) was in 21%. The visible light transmittance ($T_v$) by A light source was in 75%. The solar radiation transmittance ($T_s$) was in 46%. The dominant wavelength (D) by $D_{65}$ light source was in 543 nm. Excitation purity (Pe) was in 4%.

Example 1-3

Using glass raw materials almost similar to Example 1-1, an examination was continued by changing the glass composition. As a result, the glass composition was in weight expression 69.5% $SiO_2$, 1.6% $Al_2O_3$, 8.0% CaO, 3.7% MgO, 12.4% $Na_2O$, 1.0% $K_2O$, 0.1% $SO_3$, 0.32% total $Fe_2O_3$, 1.4% $CeO_2$, 1.9% $TiO_2$, 7 ppm $Cr_2O_3$, 180 ppm MnO, and 0.2% $SnO_2$. FeO was in 0.135%. $FeO/Fe_2O_3$ was 0.42 in weight ratio expression. $CeO_2/TiO_2$ was 0.7 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.9%. $SiO_2+Al_2O_3+TiO_2$ was in 73.0%. CaO+MgO was in 11.7%. $Na_2O+K_2O$ was in 13.4%.

The ultraviolet transmittance ($T_{uv}$) by ISO/DIS9050 at 5 mm thickness was in 4.4%. 350 nm wavelength transmittance ($T_{350}$) was in 0%. 550 nm wavelength transmittance ($T_{550}$) was in 76%. 1100 nm wavelength transmittance ($T_{1100}$) was in 20%. The visible light transmittance ($T_v$) by A light source was in 73%. The solar radiation transmittance ($T_s$) was in 46%. The dominant wavelength (D) by $D_{65}$ light source was in 550 nm. Excitation purity (Pe) was in 3%.

Example 1-4

Using glass raw materials almost similar to Example 1-1, an examination was continued by changing the glass composition. As a result, the glass composition was in weight expression 70.3% $SiO_2$, 1.7% $Al_2O_3$, 8.2% CaO, 3.6% MgO, 12.6% $Na_2O$, 0.9% $K_2O$, 0.1% $SO_3$, 0.45% total $Fe_2O_3$, 1.0% $CeO_2$, 1.0% $TiO_2$, 20 ppm $Cr_2O_3$, 80 ppm MnO, and 0.2% $SnO_2$. FeO was in 0.158%. $FeO/Fe_2O_3$ was 0.30 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.8%. $SiO_2+Al_2O_3+TiO_2$ was in 73.0%. CaO+MgO was in 11.8%. $Na_2O+K_2O$ was in 13.5%.

The ultraviolet transmittance ($T_{uv}$) by ISO/DIS9050 at 5 mm thickness was in 4.0%. 350 nm wavelength transmittance ($T_{350}$) was in 0%. 550 nm wavelength transmittance ($T_{550}$) was in 72%. 1100 nm wavelength transmittance ($T_{1100}$) was in 8%. The visible light transmittance ($T_v$) by A light source was in 67%. The solar radiation transmittance ($T_s$) was in 34%. The dominant wavelength (D) by $D_{65}$ light source was in 535 nm. Excitation purity (Pe) was in 5%.

Example 1-5

Using glass raw materials almost similar to Example 1-1, an examination was continued by changing the glass composition. As a result, the glass composition was in weight expression 69.3% $SiO_2$, 1.6% $Al_2O_3$, 8.2% CaO, 3.6% MgO, 12.6% $Na_2O$, 0.9% $K_2O$, 0.1% $SO_3$, 0.38% total $Fe_2O_3$, 1.8% $CeO_2$, 1.4% $TiO_2$, 25 ppm $Cr_2O_3$, and 80 ppm MnO. FeO was in 0.200%. $FeO/Fe_2O_3$ was 0.53 in weight ratio expression.

$CeO_2/TiO_2$ was 1.3 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.9%. $SiO_2+Al_2O_3+TiO_2$ was in 72.3%. CaO+MgO was in 11.8%. $Na_2O+K_2O$ was in 13.5%.

The ultraviolet transmittance ($T_{uv}$) by ISO/DIS9050 at 5 mm thickness was in 3.5%. 350 nm wavelength transmittance ($T_{350}$) was in 0%. 550 nm wavelength transmittance ($T_{550}$) was in 70%. 1100 nm wavelength transmittance ($T_{1100}$) was in 13%. The visible light transmittance ($T_v$) by A light source was in 76%. The solar radiation transmittance ($T_s$) was in 45%. The dominant wavelength (D) by $D_{65}$ light source was in 550 nm. Excitation purity (Pe) was in 5%.

Comparative Example 1-1

Using glass raw materials almost similar to Example 1-1, the coloring raw materials in the glass composition were changed. As a result, the glass composition was in weight expression 71.2% $SiO_2$, 1.9% $Al_2O_3$, 8.3% CaO, 3.7% MgO, 13.0% $Na_2O$, 0.9% $K_2O$, 0.2% $SO_3$, 0.62% total $Fe_2O_3$, 0.1% $TiO_2$, and 7 ppm CoO. FeO was in 0.12%. $FeO/Fe_2O_3$ was 0.19 in weight ratio expression. $CeO_2/TiO_2$ was 0 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.9%. $SiO_2+Al_2O_3+TiO_2$ was in 73.2%. CaO+MgO was in 12.0%. $Na_2O+K_2O$ was in 13.9%.

The ultraviolet transmittance ($T_{uv}$) by ISO/DIS9050 at 5 mm thickness was in 25%. 350 nm wavelength transmittance ($T_{350}$) was in 20%. 550 nm wavelength transmittance ($T_{550}$) was in 79%. 1100 nm wavelength transmittance ($T_{1100}$) was in 24%. The visible light transmittance ($T_v$) by A light source was in 76%. The solar radiation transmittance ($T_s$) was in 50%. The dominant wavelength (D) by $D_{65}$ light source was in 500 nm. Excitation purity (Pe) was in 3%. The measurement results, converted to 5 mm thickness, of transmittance relative to wavelength, together with the results of Example 1, are shown in FIG. 1. Although it is a greenish glass, its transmittance of ultraviolet rays and infrared rays is high, and its characteristics are different from those of the ultraviolet and infrared absorptive glass of Example 1-1.

Comparative Example 1-2

Using glass raw materials almost similar to Example 1-1, the coloring raw materials in the glass composition were changed. As a result, the glass composition was in weight expression 70.1% $SiO_2$, 1.6% $Al_2O_3$, 8.2% CaO, 3.6% MgO, 12.6% $Na_2O$, 0.9% $K_2O$, 0.1% $SO_3$, 0.62% total $Fe_2O_3$, 0.7% $CeO_2$, 0.5% $TiO_2$, 55 ppm $Cr_2O_3$, and 220 ppm MnO. FeO was in 0.15%. $FeO/Fe_2O_3$ was 0.25 in weight ratio expression. $CeO_2/TiO_2$ was 1.4 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 98.9%. $SiO_2+Al_2O_3+TiO_2$ was in 72.2%. CaO+MgO was in 11.8%. $Na_2O+K_2O$ was in 13.5%.

The ultraviolet transmittance ($T_{uv}$) by ISO/DIS9050 at 5 mm thickness was in 10%. 350 nm wavelength transmittance ($T_{350}$) was in 2.2%. 550 nm wavelength transmittance ($T_{550}$) was in 65%. 1100 nm wavelength transmittance ($T_{1100}$) was in 18%. The visible light transmittance ($T_v$) by A light source was in 73%. The solar radiation transmittance ($T_s$) was in 45%. The dominant wavelength (D) by $D_{65}$ light source was in 506 nm. Excitation purity (Pe) was in 3%.

Comparative Example 1-3

Using glass raw materials almost similar to Example 1-2, the coloring raw materials in the glass composition were changed. As a result, the glass composition was in weight expression 68.5% $SiO_2$, 1.8% $Al_2O_3$, 8.2% CaO, 3.6% MgO, 12.7% $Na_2O$, 0.9% $K_2O$, 0.1% $SO_3$, 0.32% total $Fe_2O_3$, 0.80% $CeO_2$, 3.0% $TiO_2$, 20 ppm $Cr_2O_3$, and ppm MnO. FeO was in 0.08%. $FeO/Fe_2O_3$ was 0.25 in weight ratio expression. $CeO_2/TiO_2$ was 0.27 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.9%. $SiO_2+Al_2O_3+TiO_2$ was in 73.3%. CaO+MgO was in 11.8%. $Na_2O+K_2O$ was in 13.6%.

The ultraviolet transmittance ($T_{uv}$) by ISO/DIS9050 at 5 mm thickness was in 4.2%. 350 nm wavelength transmittance ($T_{350}$) was in 0%. 550 nm wavelength transmittance ($T_{550}$) was in 83%. 1100 nm wavelength transmittance ($T_{1100}$) was in 30%. The visible light transmittance ($T_v$) by A light source was in 79%. The solar radiation transmittance ($T_s$) was in 53%. The dominant wavelength (D) by $D_{65}$ light source was in 595 nm. Excitation purity (Pe) was in 6%.

Comparative Example 1-4

Using glass raw materials almost similar to Example 1-1, the coloring raw materials in the glass composition were changed. As a result, the glass composition was in weight expression 70.1% $SiO_2$, 1.8% $Al_2O_3$, 8.2% CaO, 3.6% MgO, 12.6% $Na_2O$, 0.9% $K_2O$, 0.1% $SO_3$, 0.42% total $Fe_2O_3$, 0.5% $CeO_2$, and 0.5% $TiO_2$. FeO was in 0.21%. $FeO/Fe_2O_3$ was 0.5 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 98.7%. $SiO_2+Al_2O_3+TiO_2$ was in 72.4%. CaO+MgO was in 11.8%. $Na_2O+K_2O$ was in 13.5%.

The ultraviolet transmittance ($T_{uv}$) by ISO/DIS9050 at 5 mm thickness was in 15.0%. 350 nm wavelength transmittance ($T_{350}$) was in 3.0%. 550 nm wavelength transmittance ($T_{550}$) was in 75%. 1100 nm wavelength transmittance ($T_{1100}$) was in 12%. The visible light transmittance ($T_v$) by A light source was in 72%. The solar radiation transmittance ($T_s$) was in 25%. The dominant wavelength (D) by $D_{65}$ light source was in 500 nm. Excitation purity (Pe) was in 10%.

Comparative Example 1-5

Using glass raw materials almost similar to Example 1-1, the parent composition, together with the coloring raw materials in the glass composition, was partly changed. As a result, there was obtained a glass having a composition in weight expression of 69.4% $SiO_2$, 1.6% $Al_2O_3$, 8.2% CaO, 3.6% MgO, 12.6% $Na_2O$, 0.9% $K_2O$, 0.1% $SO_3$, 0.28% total $Fe_2O_3$, 2.2% $CeO_2$, 1.0% $TiO_2$, 17 ppm $Cr_2O_3$, and 2.2% ZnO. FeO was in 0.13%. $FeO/Fe_2O_3$ was 0.46 in weight ratio expression. $CeO_2/TiO_2$ was 2.2 in weight ratio expression. The total of $SiO_2+Al_2O_3+Fe_2O_3+CaO+MgO+Na_2O+K_2O+SO_3+CeO_2+TiO_2+Cr_2O_3+MnO$ was in 99.9%. $SiO_2+Al_2O_3+TiO_2$ was in 72.0%. CaO+MgO was in 11.8%. $Na_2O+K_2O$ was in 13.5%.

The ultraviolet transmittance ($T_{uv}$) by ISO/DIS9050 at 5 mm thickness was in 2.5%. 350 nm wavelength transmittance ($T_{350}$) was in 0%. 550 nm wavelength transmittance ($T_{550}$) was in 78%. 1100 nm wavelength transmittance ($T_{1100}$) was in 35%. The visible light transmittance ($T_v$) by A light source was in 78%. The solar radiation transmittance ($T_s$) was in 55%. The dominant wavelength (D) by $D_{65}$ light source was in 595 nm. Excitation purity (Pe) was in 11%.

Example 2-1

As glass raw materials, there were used silica sand, feldspar, soda ash, dolomite, limestone, mirabilite, rouge, titanium oxide, and cerium carbonate. Furthermore, there were also used chemical reagents of $Al_2O_3$, $Fe_2O_3$, $CaCO_3$, $MgCO_3$, $Na_2CO_3$, $K_2CO_3$, $CeO_2$, $TiO_2$ and SnO, in addition to ilmenite and slug. Using these, a predetermined glass composition was previously set as a target composition, and they were weighed and mixed together. As a raw material batch, mirabilite/(silicon sand+feldspar) was adjusted to about 1%, and cullet was adjusted to about 50%.

The same steps as those of Example 1-1 were conducted by using the above mixed raw material. The resulting sample was subjected to the same analyses as those of Example 1-1.

The glass composition was in weight expression 69.9% $SiO_2$, 1.7% $Al_2O_3$, 8.2% CaO, 3.6% MgO, 12.7% $Na_2O$, 0.9% $K_2O$, 0.1% $SO_3$, 0.38% total $Fe_2O_3$, 1.0% $CeO_2$, 1.0% $TiO_2$, 0.5% SnO and 17 ppm $Cr_2O_3$. FeO was in 0.17%. $FeO/Fe_2O_3$ was 0.5 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 99.9%. $SiO_2+Al_2O_3+TiO_2$ was in 72.6%. $CaO+MgO$ was in 11.8%. $Na_2O+K_2O$ was in 13.6%.

The ultraviolet transmittance ($T_{uv}$) by ISO/DIS9050 at 5 mm thickness was in 6.0%. 350 nm wavelength transmittance ($T_{350}$) was in 0.7%. 550 nm wavelength transmittance ($T_{550}$) was in 75%. 1100 nm wavelength transmittance ($T_{1100}$) was in 17%. The visible light transmittance ($T_v$) by A light source was in 71%. The solar radiation transmittance ($T_s$) was in 41%. The dominant wavelength (D) by $D_{65}$ light source was in 525 nm. Excitation purity (Pe) was in 4%. The measurement results of transmittance relative to wavelength are shown in FIG. 1. It is understood that transmittance of ultraviolet and infrared region is low and that it has a characteristic of ultraviolet absorption and infrared absorption.

Example 2-2

Using glass raw materials almost similar to Example 2-1, an examination was conducted by changing the glass composition. As a result, the glass composition was in weight expression 69.7% $SiO_2$, 1.6% $Al_2O_3$, 8.2% CaO, 3.6% MgO, 12.6% $Na_2O$, 0.9% $K_2O$, 0.1% $SO_3$, 0.47% total $Fe_2O_3$, 1.0% $CeO_2$, 1.0% $TiO_2$, 0.6% SnO and 13 ppm $Cr_2O_3$. FeO was in 0.19%. $FeO/Fe_2O_3$ was 0.40 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 99.9%. $SiO_2+Al_2O_3+TiO_2$ was in 72.5%. $CaO+MgO$ was in 11.8%. $Na_2O+K_2O$ was in 13.5%.

The ultraviolet transmittance ($T_{uv}$) by ISO/DIS9050 at 5 mm thickness was in 4.5%. 350 nm wavelength transmittance ($T_{350}$) was in 0.3%. 550 nm wavelength transmittance ($T_{550}$) was in 73%. 1100 nm wavelength transmittance ($T_{1100}$) was in 13%. The visible light transmittance ($T_v$) by A light source was in 71%. The solar radiation transmittance ($T_s$) was in 37%. The dominant wavelength (D) by $D_{65}$ light source was in 530 nm. Excitation purity (Pe) was in 4%.

Example 2-3

Using glass raw materials almost similar to Example 2-1, an examination was continued by changing the glass composition. As a result, the glass composition was in weight expression 69.6% $SiO_2$, 1.6% $Al_2O_3$, 8.0% CaO, 3.7% MgO, 12.4% $Na_2O$, 1.0% $K_2O$, 0.1% $SO_3$, 0.32% total $Fe_2O_3$, 1.2% $CeO_2$, 1.5% $TiO_2$, 0.4% SnO, 7 ppm $Cr_2O_3$ and 180 ppm MnO. FeO was in 0.135%. $FeO/Fe_2O_3$ was 0.47 in weight ratio expression. $CeO_2/TiO_2$ was 0.8 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 99.8%. $SiO_2+Al_2O_3+TiO_2$ was in 72.7%. $CaO+MgO$ was in 11.7%. $Na_2O+K_2O$ was in 13.4%.

The ultraviolet transmittance ($T_{uv}$) by ISO/DIS9050 at 5 mm thickness was in 4.4%. 350 nm wavelength transmittance ($T_{350}$) was in 0%. 550 nm wavelength transmittance ($T_{550}$) was in 76%. 1100 nm wavelength transmittance ($T_{1100}$) was in. 23%. The visible light transmittance ($T_v$) by A light source was in 72%. The solar radiation transmittance ($T_s$) was in 45%. The dominant wavelength (D) by $D_{65}$ light source was in 535 nm. Excitation purity (Pe) was in 3%.

Example 2-4

Using glass raw materials almost similar to Example 2-1, an examination was continued by changing the glass composition. As a result, the glass composition was in weight expression 70.1% $SiO_2$, 1.7% $Al_2O_3$, 8.2% CaO, 3.6% MgO, 12.6% $Na_2O$, 0.9% $K_2O$, 0.1% $SO_3$, 0.45% total $Fe_2O_3$, 1.0% $CeO_2$, 1.0% $TiO_2$, 0.2% SnO, 15 ppm $Cr_2O_3$ and 184 ppm MnO. FeO was in 0.158%. $FeO/Fe_2O_3$ was 0.30 in weight ratio expression. $CeO_2/TiO_2$ was 1.0 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 99.9%. $SiO_2+Al_2O_3+TiO_2$ was in 72.8%. $CaO+MgO$ was in 11.8%. $Na_2O+K_2O$ was in 13.5%.

The ultraviolet transmittance ($T_{uv}$) by ISO/DIS9050 at 5 mm thickness was in 5.1%. 350 nm wavelength transmittance ($T_{350}$) was in 0%. 550 nm wavelength transmittance ($T_{550}$) was in 76%. 1100 nm wavelength transmittance ($T_{1100}$) was in 24%. The visible light transmittance ($T_v$) by A light source was in 72%. The solar radiation transmittance ($T_s$) was in 47%. The dominant wavelength (D) by $D_{65}$ light source was in 550 nm. Excitation purity (Pe) was in 5%.

Example 2-5

Using glass raw materials almost similar to Example 2-1, an examination was continued by changing the glass composition. As a result, the glass composition was in weight expression 69.6% $SiO_2$, 1.6% $Al_2O_3$, 8.2% CaO, 3.6% MgO, 12.6% $Na_2O$, 0.9% $K_2O$, 0.1% $SO_3$, 0.38% total $Fe_2O_3$, 1.5% $CeO_2$, 1.2% $TiO_2$, 0.3% SnO, 16 ppm $Cr_2O_3$ and 180 ppm MnO. FeO was in 0.13%. $FeO/Fe_2O_3$ was 0.35 in weight ratio expression. $CeO_2/TiO_2$ was 1.3 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 99.9%. $SiO_2+Al_2O_3+TiO_2$ was in 72.4%. $CaO+MgO$ was in 11.8%. $Na_2O+K_2O$ was in 13.5%.

The ultraviolet transmittance ($T_{uv}$) by ISO/DIS9050 at 5 mm thickness was in 4.2%. 350 nm wavelength transmittance ($T_{350}$) was in 0%. 550 nm wavelength transmittance ($T_{550}$) was in 77%. 1100 nm wavelength transmittance ($T_{1100}$) was in 25%. The visible light transmittance ($T_v$) by A light source was in 73%. The solar radiation transmittance ($T_s$) was in 47%. The dominant wavelength (D) by $D_{65}$ light source was in 550 nm. Excitation purity (Pe) was in 5%.

Comparative Example 2-1

Using glass raw materials almost similar to Example 1, the coloring raw materials in the glass composition were changed. As a result, the glass composition was in weight expression 71.1% $SiO_2$, 1.9% $Al_2O_3$, 8.3% CaO, 3.6% MgO, 13.0% $Na_2O$, 0.8% $K_2O$, 0.1% $SO_3$, 0.54% total $Fe_2O_3$, 0.1% $TiO_2$, and 17 ppm $Cr_2O_3$. FeO was in 0.13%. $FeO/Fe_2O_3$ was 0.26 in weight ratio expression. $CeO_2/TiO_2$ was 0 in weight ratio expression. The total of $SiO_2+Al_2O_3+Fe_2O_3+CaO+MgO+Na_2O+K_2O+SO_3+CeO_2+TiO_2+SnO+Cr_2O_3+Mn$ O was in 99.9%. $SiO_2+Al_2O_3+TiO_2$ was in 73.1%. CaO+MgO was in 11.9%. $Na_2O+K_2O$ was in 13.8%.

The ultraviolet transmittance ($T_{uv}$) by ISO/DIS9050 at 5 mm thickness was in 29%. 350 nm wavelength transmittance ($T_{350}$) was in 20%. 550 nm wavelength transmittance ($T_{550}$) was in 79%. 1100 nm wavelength transmittance ($T_{1100}$) was in 27%. The visible light transmittance ($T_v$) by A light source was in 76%. The solar radiation transmittance ($T_s$) was in 52%. The dominant wavelength (D) by $D_{65}$ light source was in 500 nm. Excitation purity (Pe) was in 3%. The measurement results of transmittance relative to wavelength, together with the results of Example 1, are shown in FIG. 1. Although it is a greenish glass, its transmittance of ultraviolet rays and infrared rays is high, and its characteristics are different from those of the ultraviolet and infrared absorptive glass of Example 1-1.

Comparative Example 2-2

Using glass raw materials almost similar to Example 2-1, the coloring raw materials in the glass composition were changed. As a result, the glass composition was in weight expression 70.1% $SiO_2$, 1.6% $Al_2O_3$, 8.2% CaO, 3.6% MgO, 12.6% $Na_2O$, 0.9% $K_2O$, 0.1% $SO_3$, 0.62% total $Fe_2O_3$, 0.7% $CeO_2$, 0.6% $TiO_2$, 0.9% SnO, 35 ppm $Cr_2O_3$ and 220 ppm MnO. FeO was in 0.30%. $FeO/Fe_2O_3$ was 0.53 in weight ratio expression. $CeO_2/TiO_2$ was 1.2 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 98.9%. $SiO_2+Al_2O_3+TiO_2$ was in 72.2%. CaO+MgO was in 11.8%. $Na_2O+K_2O$ was in 13.5%.

The ultraviolet transmittance ($T_{uv}$) by ISO/DIS9050 at 5 mm thickness was in 10%. 350 nm wavelength transmittance ($T_{350}$) was in 2.2%. 550 nm wavelength transmittance ($T_{550}$) was in 65%. 1100 nm wavelength transmittance ($T_{1100}$) was in 6%. The visible light transmittance ($T_v$) by A light source was in 60%. The solar radiation transmittance ($T_s$) was in 31%. The dominant wavelength (D) by $D_{65}$ light source was in 506 nm. Excitation purity (Pe) was in 5%.

Comparative Example 2-3

Using glass raw materials almost similar to Example 2-2, the coloring raw materials in the glass composition were changed. As a result, the glass composition was in weight expression 68.5% $SiO_2$, 1.8% $Al_2O_3$, 8.2% CaO, 3.6% MgO, 12.7% $Na_2O$, 0.9% $K_2O$, 0.1% $SO_3$, 0.25% total $Fe_2O_3$, 0.9% $CeO_2$, 1.8% $TiO_2$, 0.9% SnO, 35 ppm $Cr_2O_3$ and 180 ppm MnO. FeO was in 0.10%. $FeO/Fe_2O_3$ was 0.46 in weight ratio expression. $CeO_2/TiO_2$ was 0.5 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 99.9%. $SiO_2+Al_2O_3+TiO_2$ was in 73.3%. CaO+MgO was in 11.8%. $Na_2O+K_2O$ was in 13.6%.

The ultraviolet transmittance ($T_{uv}$) by ISO/DIS9050 at 5 mm thickness was in 6.1%. 350 nm wavelength transmittance ($T_{350}$) was in 0.3%. 550 nm wavelength transmittance ($T_{550}$) was in 70%. 1100 nm wavelength transmittance ($T_{1100}$) was in 29%. The visible light transmittance ($T_v$) by A light source was in 66%. The solar radiation transmittance ($T_s$) was in 54%. The dominant wavelength (D) by $D_{65}$ light source was in 540 nm. Excitation purity (Pe) was in 5%.

Comparative Example 2-4

Using glass raw materials almost similar to Example 2-1, the coloring raw materials in the glass composition were changed. As a result, the glass composition was in weight expression 70.1% $SiO_2$, 1.8% $Al_2O_3$, 8.2% CaO, 3.6% MgO, 12.6% $Na_2O$, 0.9% $K_2O$, 0.1% $SO_3$, 0.63% total $Fe_2O_3$, 1.8% $CeO_2$, 0.9% $TiO_2$, and 0.9% SnO. FeO was in 0.20%. $FeO/Fe_2O_3$ was 0.35 in weight ratio expression. $CeO_2/TiO_2$ was 2.0 in weight ratio expression. The total of $SiO_2+Al_2O_3+Fe_2O_3+CaO+MgO+Na_2O+K_2O+SO_3+CeO_2+TiO_2+SnO+Cr_2O_3+MnO$ was in 98.7%. $SiO_2+Al_2O_3+TiO_2$ was in 72.4%. CaO+MgO was in 11.8%. $Na_2O+K_2O$ was in 13.5%.

The ultraviolet transmittance ($T_{uv}$) by ISO/DIS9050 at 5 mm thickness was in 3%. 350 nm wavelength transmittance ($T_{350}$) was in 0%. 550 nm wavelength transmittance ($T_{550}$) was in 64%. 1100 nm wavelength transmittance ($T_{1100}$) was in 13%. The visible light transmittance ($T_v$) by A light source was in 59%. The solar radiation transmittance ($T_s$) was in 38%. The dominant wavelength (D) by $D_{65}$ light source was in 530 nm. Excitation purity (Pe) was in 7%.

The invention claimed is:

1. In a soda-lime-silica series glass, an ultraviolet and infrared absorptive greenish glass, which is characterized in that, in an expression of weight %, it comprises at least coloring components of 0.3-0.5% of total $Fe_2O_3$, 0.8-2.0% $CeO_2$, 0.8-2.0% $TiO_2$, and 0.10-0.25% FeO, that $CeO_2/TiO_2$ is 0.7-1.3 in weight ratio expression, and that the glass at 5 mm thickness is 9% or less in ultraviolet transmittance ($T_{uv}$) according to ISO/DIS9050, 1% or less in 350 nm wavelength transmittance ($T_{350}$), 70% or greater in 550 nm wavelength transmittance ($T_{550}$), and 25% or less in 1100 nm wavelength transmittance ($T_{1100}$).

2. An ultraviolet and infrared absorptive greenish glass according to claim 1, which is characterized in that, in an expression of weight %, it comprises 67-75% $SiO_2$, 0.5-3.0% $Al_2O_3$, 7.0-11.0% CaO, 2.0-4.2% MgO, 12-16% $Na_2O$, 0.5-3.0% $K_2O$, and 0.05-0.3% $SO_3$ in addition to the coloring components of the glass, that the sum of these components and the coloring components is 98% or greater, and that $SiO_2+Al_2O_3+TiO_2$ amounts to 70-76%, CaO+MgO amounts to 10-15%, and $Na_2O+K_2O$ amounts to 13-17%.

3. An ultraviolet and infrared absorptive greenish glass according to claim 1, which is characterized in that $FeO/Fe_2O_3$ is 0.3-0.6 in weight ratio expression.

4. An ultraviolet and infrared absorptive greenish glass according to claim 1, which is characterized in that at 5 mm thickness visible light transmittance ($T_v$) by A light source is 67% or greater, solar radiation transmittance ($T_s$) is 48% or less, dominant wavelength (D) by $D_{65}$ light source is 510-560 nm, and excitation purity (Pe) is 10% or less.

5. An ultraviolet and infrared absorptive greenish glass according to claim 1, which is characterized in comprising 5-50 ppm $Cr_2O_3$, 0-200 ppm MnO and 0-1.0% SnO as coloring components in weight % expression.

6. An ultraviolet and infrared absorptive greenish glass according to claim 1, which is characterized in that $CeO_2$ amounts to 0.8-1.5% and $TiO_2$ amounts to 0.8-1.5%, and that it comprises at least 0.1-0.7% SnO as a coloring component in weight % expression.

7. An ultraviolet and infrared absorptive greenish glass according to claim 6, which is characterized in that it comprises in weight % expression 67-75% $SiO_2$, 0.5-3.0% $Al_2O_3$, 7.0-11.0% CaO, 2.0-4.2% MgO, 12-16% $Na_2O$, 0.5-3.0% $K_2O$, and 0.05-0.3% $SO_3$ in addition to the coloring components of the glass, that the sum of these components and the coloring components is 98% or greater, and that $SiO_2$+$Al_2O_3$+$TiO_2$ amounts to 70-76%, CaO+MgO amounts to 10-15%, and $Na_2O$+$K_2O$ amounts to 13-17%.

8. An ultraviolet and infrared absorptive greenish glass according to claim 6, which is characterized in that FeO/$Fe_2O_3$ is 0.3-0.6 in weight ratio expression.

9. An ultraviolet and infrared absorptive greenish glass according to claim 6, which is characterized in that at 5 mm thickness visible light transmittance ($T_v$) by A light source is 67% or greater, solar radiation transmittance ($T_s$) is 48% or less, dominant wavelength (D) by $D_{65}$ light source is 510-560 nm, and excitation purity (Pe) is 10% or less.

10. An ultraviolet and infrared absorptive greenish glass according to claim 6, which is characterized in comprising 5-30 ppm $Cr_2O_3$ and 0-200 ppm MnO as coloring components in weight expression.

11. An ultraviolet and infrared absorptive greenish glass according to claim 1, which is characterized in that dominant wavelength (D) by $D_{65}$ light source is 520-540 nm.

12. An ultraviolet and infrared absorptive greenish glass according to claim 1, which is characterized in that dominant wavelength (D) by $D_{65}$ light source is 525-550 nm.

13. An ultraviolet and infrared absorptive greenish glass according to claim 6, which is characterized in that dominant wavelength (D) by $D_{65}$ light source is 520-540 nm.

14. An ultraviolet and infrared absorptive greenish glass according to claim 6, which is characterized in that dominant wavelength (D) by $D_{65}$ light source is 525-550 nm.

* * * * *

UNITED STATES PATENT AND TRADEMARK OFFICE
CERTIFICATE OF CORRECTION

PATENT NO. : 7,598,190 B2  
APPLICATION NO. : 10/577419  
DATED : October 6, 2009  
INVENTOR(S) : Taguchi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 656 days.

Signed and Sealed this

Twenty-eighth Day of September, 2010

David J. Kappos
*Director of the United States Patent and Trademark Office*